US005173007A

United States Patent [19]

Krajieck

[11] Patent Number: 5,173,007

[45] Date of Patent: Dec. 22, 1992

[54] METHOD AND APPARATUS FOR IN-LINE BLENDING OF AQUEOUS EMULSION

[75] Inventor: Richard W. Krajieck, Houston, Tex.

[73] Assignee: Serv-Tech, Inc., Houston, Tex.

[21] Appl. No.: 425,827

[22] Filed: Oct. 23, 1989

[51] Int. Cl.[5] .......... B01F 5/04; B01J 13/00; B65G 65/00

[52] U.S. Cl. .......... 405/59; 137/13; 252/314; 366/167; 366/173; 406/197

[58] Field of Search .......... 252/312, 314; 137/13; 405/59; 406/47, 197; 366/167, 173

[56] References Cited

U.S. PATENT DOCUMENTS

| | | | |
|---|---|---|---|
| 1,496,858 | 6/1924 | Knollenberg | 252/314 |
| 2,265,801 | 12/1941 | Cooke | 406/197 X |
| 2,509,288 | 5/1950 | Brochner | 366/173 |
| 2,868,516 | 1/1959 | Moseley | 366/167 X |
| 3,425,429 | 2/1969 | Kane | 137/13 |
| 3,487,844 | 1/1970 | Simon et al. | 137/13 |
| 3,552,128 | 1/1971 | Shook | 405/59 |
| 3,734,111 | 5/1973 | McClintock | 137/3 |
| 3,822,721 | 7/1974 | Verschuur | 137/13 X |
| 3,826,279 | 7/1974 | Verschuur | 137/13 X |
| 3,865,136 | 2/1975 | Verschuur | 137/13 X |
| 3,886,972 | 6/1975 | Scott et al. | 137/602 |
| 3,993,097 | 11/1976 | Verschuur | 137/13 X |
| 4,123,800 | 10/1978 | Mazzel | 366/150 |
| 4,420,008 | 12/1983 | Shu | 137/13 X |
| 4,487,553 | 12/1984 | Nagata | 417/171 |
| 4,647,212 | 3/1987 | Hankison | 366/165 |
| 4,908,154 | 3/1990 | Cook et al. | 252/314 |
| 4,996,004 | 2/1991 | Bücheler et al. | 252/314 |
| 5,011,293 | 4/1991 | Roop et al. | 252/314 X |

*Primary Examiner*—Richard D. Lovering
*Attorney, Agent, or Firm*—John R. Kirk, Jr.; Mark A. Oathout; Gordon T. Arnold

[57] ABSTRACT

Method and apparatus for the in-line blending of a crude oil with an aqueous hydrocarbon emulsion, such as an aqueous emulsion formed in-situ in a cavern in a salt dome, wherein the crude oil and aqueous crude oil emulsion are separately fed to a dynamic in-line blender wherein the crude oil is formed into a flowing crude oil shear curtain and wherein the stream of the aqueous crude oil emulsion is charged to the interior of the flowing crude oil shear curtain, whereby the aqueous emulsion is impacted upon and fragmented by the crude oil of the flowing crude oil shear curtain to form a flowing suspension of finely divided aqueous emulsion particles in the crude oil.

9 Claims, 4 Drawing Sheets

METHOD AND APPARATUS FOR IN-LINE BLENDING OF AQUEOUS EMULSION

TECHNICAL FIELD OF THE INVENTION

This invention relates to a method and apparatus for the in-line blending of an aqueous emulsion with crude oil. More particularly, this invention relates to an apparatus for the in-line blending of crude oil with an aqueous emulsion of crude oil formed, in situ, during the storage of crude oil in a cavern in a salt dome.

It is common practice to elute elongate caverns in salt domes with water and to use such caverns for the storage of hydrocarbons such as crude oil. This is accomplished, in general, by drilling a well from the surface of the earth into the salt dome, casing the well, and then extending a tubing through the casing into the cavern in the salt dome and injecting water from the tubing into the salt in order to dissolve salt of the salt dome to form a cavern. Salt of the cavern dissolves in the injected water to form salt water, or brine, which is removed from the cavern through the casing-tubing annulus. A portion of the solid salt of the salt dome is thus replaced with brine to initiate the formation of a brine-filled cavern in the salt dome. As the cavern forms, the tubing is progressively extended until it has reached a desired depth in order to provide, for example, a cavern havinq a length of 1,000 feet or more, such as the length of about 1,000 to 2,000 feet and an average diameter of, for example, from about 100 to 300 feet.

When a hydrocarbon such as crude oil is to be stored in the thus formed cavern, it is pumped, for example, down the casing-tubing annulus of the well into the cavern in order to displace salt water which is withdrawn from the cavern through the tubing, which terminates adjacent the bottom of the cavern. Contrawise, when it is desired to remove crude oil or other hydrocarbons stored in the cavern in the salt dome, brine is pumped into the cavern through the tubing in order to force the hydrocarbon product through the casing-tubing annulus to a suitable discharge line.

The discharge line may typically lead to a crude oil storage tank, such as a storage tank having a diameter of about 100 to about 200 feet and a height of about 20 to 40 feet, where the crude oil will be stored until it is to be transported by pipeline to a desired location such as a crude oil refinery, a orude oil loading terminal, etc. With the passage of time, the water, heavy asphaltic crude oil components, etc., will separate from the stored crude oil and settle on the bottom of the tank. The sediment that is formed is commonly referred to as "Black Sediment and Water" (BS&W).

The pipeline through which the crude oil is transported on removal from the storage tank is typically an interstate pipeline because the crude oil may travel for several hundred miles before it reaches its destination. Such interstate pipelines are typically "common carriers" and transport a variety of hydrocarbon liquids for a variety of customers.

In order to prevent contamination, many pipelines, and interstate pipelines in particular, impose strict limits on the amount of BS&W that can be present in a crude oil to be transported through the pipeline. If more than a minor amount of BS&W is entrained in the crude oil, it may cause corrosion of the pipeline and/or may partially settle in the pipeline to form a source of contamination for other hydrocarbon products that are subsequently transported through the pipeline. As a consequence, it is common practice to mandate that the crude oil to be transported through the pipeline have a BS&W content of not more than about 0.6 wt. %.

The interface between the hydrocarbon and the brine in a salt dome cavern will move vertically up and down the cavern as crude oil is stored in or removed from the cavern. With the passage of time, the interface between the oil and the brine will no longer be sharply.demarcated and instead, a layer of a very tight aqueous emulsion containing, for example, from about 30 to about 50 wt. % of emulsified salt water, (e.g., brine) will form between the hydrocarbon and the brine.

The aqueous emulsion progressively forms with the passage of time and occupies a progressively larger portion of the volume of the cavern in the salt dome. Typically, the aqueous emulsion layer may be from about 10 to about 50 feet in height and extend laterally across the cavern. A layer of emulsion of this size can "entrap" as much as from about 50,000 to about 200,000 barrels of crude oil.

The aqueous crude oil emulsion, as such, has either a marginal or a negative economic value. The emulsion can be withdrawn from the salt dome cavern, for example, through the provision of a suspended casing that is sized so as to provide not only an annulus between the suspended casing and the tubing but also an annulus between the suspended casing and the casing that is normally fixed and set at the top of the cavern in the salt dome. With this arrangement, the suspended casing can be lowered into the cavern in the salt dome until its lower opening end is located in the layer of aqueous crude oil emulsion in the salt dome cavern. While maintaining a constant volume of supernatant crude oil in the salt dome cavern, brine can be pumped into the brine layer in the lower portion of the salt dome cavern, and as the brine level raises, the aqueous crude oil emulsion will be forced into the annulus between the tubing and the suspended casing and thence to the surface.

The aqueous crude oil emulsion is normally a very tight emulsion and conventional techniques for breaking aqueous crude oil emulsions such as by settling by the addition of emulsionbreaking chemicals, by heating, etc, are generally ineffective either technically or from the point of view of cost.

Technically, the aqueous emulsion withdrawn from a cavern in a salt dome is not BS&W, but it is normally classified as BS&W for quality control purposes by a pipeline company. As a consequence, the aqueous emulsion withdrawn from a salt dome, since it usually contains from about 30 to about 50 wt. % of water will normally be unacceptable, as such, for transportation through a pipeline.

However, many crude oils have a BS&W content well below the maximum pipeline transportation specification level of 0.6 wt. % BS&W, such as a level of about 0.2 wt. % BS&W or less. It can be calculated that if an aqueous crude oil emulsion withdrawn from a cavern in a salt dome contains about 30 to about 50 wt. % of water and, correspondingly, about 70 to about 50 wt. % of "emulsified and entrapped" crude oil, is blended with an appropriate amount of a crude oil having a BS&W level of less than about 0.6 wt. % of BS&W, the resultant blend will meet pipeline transportation specifications. Moreover, if the resultant blend is transported by pipeline to a crude oil refinery and processed therein, the oil content of the BS&W can be salvaged. As a consequence, the aqueous emulsion withdrawn from the cavern in the salt dome will represent an asset rather than a liability.

However, this is possible only if the blend of the aqueous crude oil emulsion with the crude oil is a stable emulsion, in the sense that no phase separation and/or settling between the particles of the aqueous crude oil emulsion and the crude oil will occur in the pipeline.

Separation will tend to occur unless the particles of the aqueous emulsion suspended in the crude oil are essentially colloidal in size. Thus, the particles of aqueous emulsion should have a maximum dimension of not more than about 10 microns, and more preferably, a diameter of 1 micron or less, such as a spread in particle sizes of from about 0.1 to about microns and, more preferably, about 0.2 to 1 micron. The method and apparatus of the present invention can provide stable suspensions of particles of aqueous crude oil salt dome emulsions in crude oils having particle sizes within the range of about 0.1 to 10 microns, such as particles sizes ranging from about 0.1 to 1 micron.

PRIOR ART

McClintock U.S. Pat. No. 3,734,111 discloses an inline blending device for adding a second fluid to a first fluid flowing through a pipeline including an orifice plate having a central circular hole formed therein for channeling flow through the pipeline through the hole in the orifice plate, a perforate sparger pipe perpendicularly mounted in the pipeline upstream of the orifice plate and a perforated frustro-conical baffle coaxially aligned with the pipeline interconnecting the perforate sparger pipe with the circular opening in the orifice plate.

Verschuur U.S. Pat. No. 3,822,721, U.S. Pat. No. 3,826,279, U.S. Pat. No. 3,865,136, and U.S. Pat. No. 3,993,097 are directed to a pipeline for transporting two immiscible fluids of different viscosities comprising a first inlet pipe for introducing the liquid having the higher viscosity into the pipeline and a second annular inlet pipe for introducing the second lower viscosity liquid into the pipeline for annular codirectional flow in respect of the first liquid.

Scott et al, U.S. Pat. No. 3,856,972 is also directed to the pipeline transportation of an immiscible viscous fluid surrounded by an annulus of less viscous fluid, but uses a nozzle having a variable area ratio mixing section for introducing the two fluids into the pipeline.

A mixer-injector for introducing an additive into a carrier stream flowing in a pipeline is disclosed in U.S. Pat. No. 4,123,800 which comprises a venturi-type throat mounted in the pipeline with perforations at the choke of the venturi and an annular chamber about the choke provided with an inlet line for introducing the additive into the chamber for flow through the perforations into the carrier stream flowing in the pipeline.

Shu U.S. Pat. No. 4,420,008 discloses a computer-controlled apparatus for mixing a viscous crude oil with an oil diluent.

A tubular housing having a tubular chamber therein for the mixing of two fluids is disclosed in Hankison U.S. Pat. No. 4,647,212 which comprises a cross-flow inlet line in the side of the tubular housing for charging a first fluid to the chamber, inlet lines for the second fluid mounted in the opposed ends of the housing and a pair of nozzle plates mounted in the chamber adjacent each of the ends thereof for divergently introducing the second fluid into the chamber for admixture with the first fluid, and an outlet line mounted in the side of the housing for withdrawing the mixture of the two fluids from the chamber.

SUMMARY OF THE INVENTION

In its broader aspects, the dynamic in-line blending apparatus of the present invention comprises a chambered housing having an inlet end and an outlet end, an emulsion inlet line extending from the inlet end of the housing into the inlet end of the chamber, a crude oil header mounted in the chamber and laterally spaced from the emulsion inlet line, an outlet line mounted on the outlet end of the chamber and extending through the outlet end of the housing, means for flowing an aqueous hydrocarbon emulsion through the inlet line into the chamber, pump means mounted on the header for discharging pressured crude oil from the header for focused impact junction with a stream of aqueous hydrocarbon emulsion flowing from the emulsion inlet line into the chamber whereby the flowing stream of aqueous hydrocarbon emulsion will be impacted upon and fragmented by the pressured crude oil to form a flowing suspension of aqueous hydrocarbon emulsion particles in said crude oil.

A preferred embodiment of the dynamic in-line blending device of the present invention for homogeneously mixing an aqueous hydrocarbon emulsion with a crude oil comprises a tubular housing, a circular crude oil header circumferentially coaxially mounted in the tubular housing, an emulsion inlet line coaxially mounted in the tubular housing inside of and centrally aligned with the circular header and the tubular housing, a crude oil charge line fluidly connected with the circular header and a plurality of crude oil ejection nozzles peripherally mounted about the header and angled toward a coaxial focal point about 2 to 4 circular header diameters downstream from the circular header.

A still more preferred specific embodiment of the dynamic in-line crude oil blender of the present invention for homogeneously mixing an aqueous crude oil emulsion with crude oil comprises:

a base;

primary dynamic tubular mixing means comprising a tubular primary blender housing mounted on the base, and a primary blender outlet line fluidly coaxially connected therewith, the primary blender housing having mounted therein;

an aqueous crude oil emulsion inlet line fluidly coaxially connected with the primary blender housing, a circular primary crude oil header circumferentially positioned about the emulsion inlet line, a primary crude oil inlet line fluidly connected with the primary header and a plurality of primary header crude oil ejection nozzles peripherally mounted on the primary header and angled to a coaxial focal point about 2 to 4 primary header diameters downstream of the primary header so that crude oil ejected from the primary header nozzles will form a primary flowing conical shear curtain to impact and fragment the aqueous crude oil emulsion and mix the thus-formed fragments with the crude oil to form an initial crude oil blend;

a connecting line interconnecting the discharge end of the primary blender housing with a secondary blender inlet line of a secondary dynamic mixer;

secondary dynamic mixing means comprising a tubular primary blender housing mounted on the base having the secondary blender inlet line and a secondary blender outlet line fluidly coaxially connected therewith;

the secondary dynamic blender also comprising a circular secondary crude oil header circumferentially positioned about the secondary blender inlet line, a secondary crude oil inlet line fluidly connected with the secondary header for supplying a second stream of crude oil thereto and a plurality of secondary crude oil ejection nozzles peripherally mounted on the secondary header and angled to a coaxial focal point about 2 to 4 secondary header diameters downstream of the secondary header so that crude oil ejected from said secondary header nozzles will form a secondary flowing conical shear curtain to impact and fragment the initial crude oil blend and mix the thus-formed fragments with the second stream of crude oil to form a final crude oil blend for discharge through said secondary blender outlet line.

The method of the present invention for blending an aqueous hydrocarbon emulsion with a crude oil comprises the steps of forming the crude oil into a flowing crude oil shear curtain and flowing a stream of the aqueous hydrocarbon emulsion into the flowing crude oil shear curtain, whereby the aqueous emulsion will be impacted upon and fragmented by the flowing crude oil shear curtain to form a flowing suspension of finely divided particles of said aqueous emulsion particles in the said crude oil.

A preferred method of the present invention comprises the in-line blending and homogeneous mixing of an aqueous crude oil emulsion withdrawn from a salt dome cavern with crude oil which comprises:

feeding a first stream of crude oil to a primary dynamic mixer and discharging said crude oil therein at a flow rate of about 200 to about 500 ft./sec. and a pressure of about 2,000 to about 4,000 psi to establish a primary flowing crude oil conical shear curtain;

feeding a stream of the aqueous crude oil emulsion to the dynamic mixer at a flow rate of about 0.1 to about 0.3 times the rate of flow of the first stream of crude oil and flowing the stream of the aqueous emulsion through the primary flowing crude oil conical shear curtain whereby the aqueous crude oil emulsion will be impacted upon and fragmented by the primary flowing crude oil conical shear curtain to form aqueous emulsion particles having diameters in the range of about 0.1 to about 10 microns, and whereby the fragments will be mixed with the first stream of crude oil to thereby form an initial blend of the fragments of the aqueous emulsion in the first stream of said crude oil;

feeding a second stream of crude oil to a secondary dynamic mixer and circumferentially discharging crude oil therein at a flow rate of about 20 to about 100 ft./sec. and a pressure of about 50 to about 500 psi to establish a secondary flowing crude oil shear curtain;

feeding a stream of the initial crude oil blend to the secondary dynamic mixer at a flow rate of about 0.1 to about 0.3 times the rate of flow of the second stream of crude oil and flowing the stream of the initial crude oil blend through the secondary flowing crude oil shear curtain whereby the initial crude oil blend will be impacted upon by the secondary flowing crude oil shear curtain and mixed with the second stream of crude oil to thereby form a final homogeneous blend of the fragments of the aqueous emulsion in the first and second streams of crude oil.

If the flow rate for the aqueous emulsion of crude oil withdrawn from a salt cavern and charged to the in-line crude oil blender of the present invention is properly proportioned in respect of the flow rate of a crude oil having a low BS&W content which is simultaneously charged to the in-line crude oil blender through the crude oil inlet lines, the final suspension of finely divided aqueous emulsion particles in the crude oil which will flow from the in-line crude oil blender through the outlet line will have a BS&W content that will meet pipeline specifications.

When an aqueous crude oil emulsion formed in a cavern in a salt dome is to be removed from the salt dome and transported through a pipeline, such as a pipeline wherein the specification for BS& W content is a content of 0.6 wt. % of the crude oil being transported in the pipeline, the lower end of the hanging casing is positioned in the salt dome cavern in the zone containing the aqueous crude oil emulsion and a tubing is lowered through the hanging casing into the water layer in the salt dome cavern. A surface line leading from the annulus between the hanging casing and the tubing is fluidly connected with a dynamic in-line blender of the present invention and the dynamic in-line blender is fluidly connected with the pipeline in which the crude oil and aqueous crude oil emulsion are to be transported.

Brine is then injected into the salt dome cavern through the tubing in order to force the aqueous crude oil emulsion into the annulus between the hanging casing and the tubing and up the annulus for discharge into the surface line leading to the dynamic in-line blender of the present invention.

A stream of a crude oil having a BS&W content of less than 0.6 wt. %, such as a BS&W content of about than 0.2 wt. % is separately charged to an in-line blending unit for flow from the ejection nozzles at a flow rate of about 200 to about 500 ft./sec. and a pressure of about 2,000 to about 4,000 psi, and also, to establish a primary flowing crude oil shear curtain.

The aqueous crude oil emulsion brought from the salt dome cavern to the inlet end of the in-line blending unit is charged to the flowing crude oil shear curtain to provide a zone of flow conjunction with the flowing crude oil shear curtain where the aqueous crude oil emulsion is impacted upon by the flowing crude oil shear curtain and fragmented into particles having diameters of from about 0.1 to 10 microns to form an initial flowing suspension of fragmented aqueous emulsion in crude oil for flow from the unit.

In the event that the initial suspension has a BS&W content of more than about 0.6 wt. %, and/or contains oversized aqueous emulsion particles, the initial suspension may be charged to a secondary dynamic blender of the present invention, which may be located adjacent to or remotely from the primary dynamic in-line blending unit.

A secondary stream of crude oil having an appropriate BS&W content of less than 0.6 wt. % is charged to the secondary in-line blender and discharged from the ejection nozzles at a flow rate of about 20 to 100 ft./sec. and a pressure of about 50 to 500 psig to form a secondary flowing crude oil shear curtain and the initial suspension formed in the primary dynamic blender is charged to the secondary flowing crude oil shear curtain to provide a secondary zone of flow conjunction with the flowing secondary crude oil shear curtain where the initial suspension is impacted upon by the flowing secondary crude oil shear curtain and fragmented and mixed with the secondary stream of crude oil to form a final flowing suspension of fragmented aqueous emulsion in crude oil charged the primary and secondary dynamic blenders that meets pipeline transportation specifications.

Thus, for example, an aqueous crude oil emulsion withdrawn from a cavern in a salt dome may be charged to the interior of the pr,mary flowing conical crude oil shear curtain at a flow rate sufficient to provide a ratio of about 3 to about 6 parts of crude oil per part of aqueous crude oil emulsion for flow into the primary flowing conical crude oil shear curtain where the aqueous emulsion is impacted upon and fragmented by the primary flowing conical crude oil shear curtain to form a flowing initial suspension of finely divided aqueous emulsion particles in the crude oil which is thereafter charged to the interior of the secondary flowing conical shear curtain of additional crude oil at a flow rate sufficient to provide a ratio of about 5 to about 10 parts of additional crude oil per part of initial suspension for flow into the secondary flowing crude oil shear curtain where the aqueous emulsion particles of the initial suspension are further impacted upon by the secondary flowing crude oil shear curtain to form a flowing final stable suspension of finely divided aqueous emulsion particles in the crude oil having a particle size of about 0.1 to about 10 microns and a BS&W content of not more than about 0.6 wt. %.

DETAILED DESCRIPTION

Figure 1:
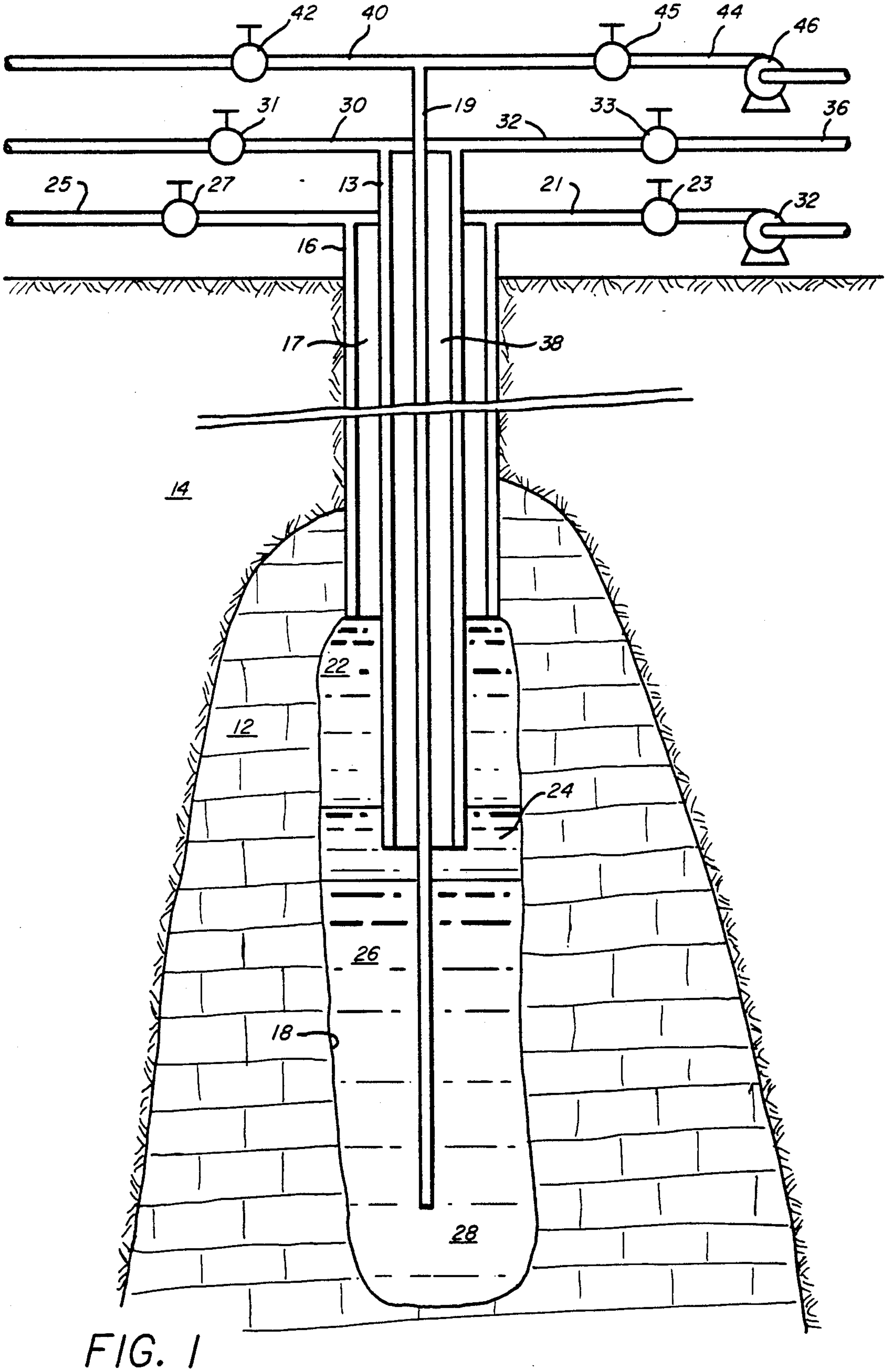
FIG. 1 is a schematic sectional view illustrating a subterranean salt dome into which a storage cavern has been eluted, which may be used for the storage of crude nil.
Figure 2:
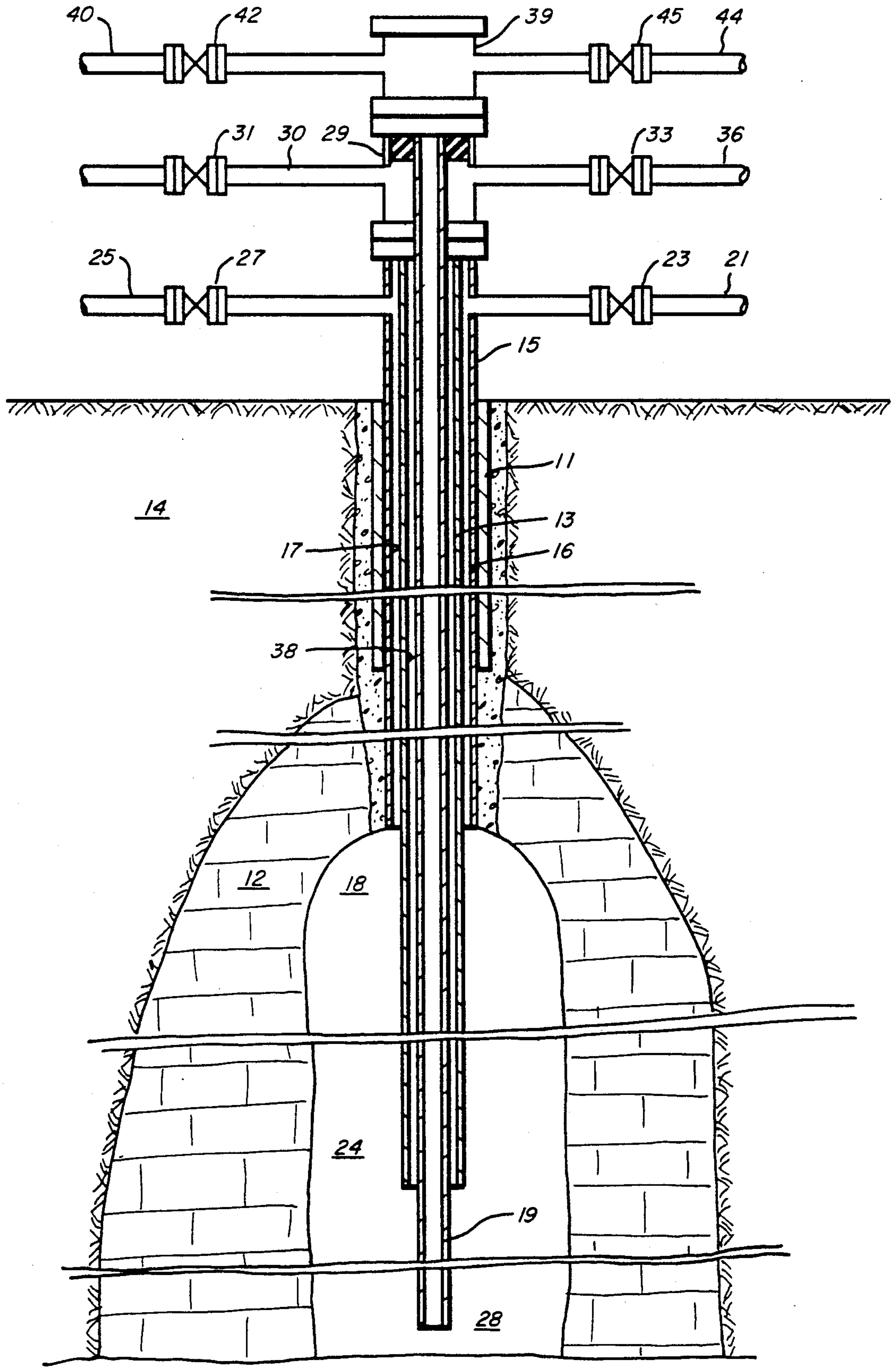
FIG. 2 is a schematic sectional view, to an enlarged scale, illustrating in greater detail the manner in which the fixed casing, the hanging casing, and the tubing are mounted in a well extending from the surface of the ground to a cavern in a salt dome.

Turning now to FIGS. 1 and 2, there is schematically shown a sectional view of a subsurface salt dome designated generally by the numeral 12 which penetrates a plurality of layers of sedimentary rock 14. The salt dome 12 is penetrated, in turn, by a well extending from the surface of the ground into the salt dome to the top of a salt dome cavern 18 that has been eluted therein. The salt dome cavern may contain, for example, a lower level of brine 26, a supernatant layer of stored crude oil 22, and a layer of aqueous crude oil emulsion 24 sandwiched between the brine 26 and the stored crude oil 22.

As is shown more clearly in FIG. 2, and in accordance with normal practice, a large diameter surface casing 11 is cemented into place at the wellhead and a second string of casing 16 (which may suitably be the production casing used in originally drilling the well) is inserted into the bore of the well to a point adjacent the top of the salt dome cavern 18 and cemented into place. The second string of casing 16 is normally referred to as the "fixed casing".

An inner string of casing ("hanging casing") 13 is inserted into the well inside of the fixed casing 16 and lowered into the salt dome cavern 18 until the lower open end thereof, for example, is located in the zone containing the aqueous crude oil emulsion 24. Finally, a string of tubing 19 is inserted into the well inside the hanging casing 13 and extended into the salt dome cavern 18 to a point adjacent the bottom thereof.

Appropriate wellhead equipment is mounted onto the well at the surface including, for example, a fixed casing hanger 15 to which the fixed casing 16 is secured and on which, in turn, are mounted a crude oil inlet line 21 controlled by oil inlet valve 23 and a crude oil outlet line 25 controlled by a crude oil outlet valve 27. In accordance with this mode of installation, the crude oil inlet line 21 and the crude oil outlet line 25 are in fluid communication with the interior of the fixed casing hanger 15 which is in fluid communication with the outer annulus 17 between the fixed casing 16 and the hanging casing 13 and which is, in turn, in fluid communication with the top of the salt dome cavern 18. A hanging casing hanger 29 is mounted to and above the fixed casing hanger 15 and the top of the hanging casing 13 is releasably secured thereto so that during workover operations joints of the pipe comprising the hanging casing 13 can be added thereto or removed therefrom in order to adjust the level in the salt dome cavern 18 of the open bottom end of the hanging casing 13 so that the bottom of the hanging casing 13 can be located in the layer 24 of the aqueous crude oil emulsion. An outlet line 30 controlled by an outlet valve 31 and an inlet line 36 controlled by an inlet valve 33 are mounted on the hanger 29 in fluid communication with the interior thereof and also in hanging casing 29 and the tubing 19 so that the open end of the hanging casing 13, as indicated, is in fluid communication with the layer 24 of aqueous crude oil emulsion in &:he salt dome cavern 18.

In the schematic showing of FIG. 2, the wellhead is capped with a tubing hanger 39 which is mounted to and on top of the hanger 29. It will be understood that in actual practice, the "Christmas Tree" comprising the wellhead will contain such other items of equipment, such as gauges, meters, sensors, etc. (not shown) as are necessary or desirable for effective operations. The tubing 19 is releasably suspended from the tubing hanger 39 and the string of tubing 19 is of a length such that the open bottom of the string of tubing 19 is adjacent the bottom of the salt dome cavern 28. The tubing hanger 39 is provided with a water outlet line 40 controlled by a water outlet line valve 42 and a water charge line 44 controlled by a water charge line 45 which are in fluid communication with the interior of the tubular hanger 39 which is, in turn, in fluid communication with the interior of the string of tubing 19 so that brine may be injected or withdrawn from the salt dome cavern 18, as needed.

In operation, if additional orude oil is to be st.ored in the cavern, the orude oil inlet valve 23 and the water outlet line valve 42 are opened and a crude oil pump 32 fluidly connected with the crude oil inlet line 21 is started so that crude oil can be charged to the salt dome cavern 18 through the crude oil inlet line 21 and so that an equivalent volume of displaced brine can flow from the salt dome cavern 18 through the water outlet line 40.

When crude oil is to be withdrawn from the salt dome cavern 18, the crude oil inlet line valve 23 and the water outlet valve 42 are closed and the water charge line valve 45 and the crude oil outlet valve 27 are opened. A water pump 46 in fluid communication with the water charge line 44 is actuated to pump brine into the bottom of the salt dome cavern through the string of tubing 19. As a consequence, crude oil will be displaced from the salt dome cavern 18 through the outer annulus 17 and through the crude oil outlet line 25. With the passage of time, a layer 24 of aqueous crude oil emulsion will form in the salt dome cavern at the interface between the brine layer 26 and the superantant crude oil layer 22. Because of the very significant pressure exerted on the aqueous crude oil emulsion layer 24 by the supernatant layer of crude oil 22, the aqueous crude oil emulsion will be tightened and compacted and become resistant to resolution into the brine and crude oil components thereof.

The aqueous crude oil emulsion 24 can be withdrawn from the salt dome cavern 18 in any suitable manner. For example, the outlet line valve 31 and the water charge line valve 45 may be opened and the water pump 46 can be actuated so that brine can be pumped into the bottom of the salt dome cavern 18. Since the only surface valve that is open is outlet line valve 31, the volume of the crude oil 22 in the salt dome cavern 18 will remain unchanged and the aqueous emulsion layer 24 will be "squeezed" into and up the inner annulus 38 between the hanging casing 13 and the tubing 19 and out of the well through outlet line 30. Alternately, the water charge line valve 45 can be closed and the crude oil inlet valve 23 can be opened so that additional crude oil can be pumped into the salt dome cavern 18 by the crude oil pump 32 through the crude oil inlet line 21. Since the volume of the brine 26 will remain constant, again, the aqueous crude oil emulsion in the layer 24 will be "squeezed" into and up the inner annulus 38 between the hanging casing 13 and the tubing 19 and out of the well through outlet line 30.

Aqueous crude oil emulsions of the type formed in salt domes, as withdrawn, normally will contain from about 30 to about 50 wt. % of brine and do not meet pipeline shipping specifications, which usually call for a BS&W content of about 0.6 wt. % because the aqueous crude oil emulsion withdrawn from the salt cavern being classified as BS&W for this purpose.

In order to transport the aqueous crude oil emulsion, in accordance with the present invention, it is dynamically mixed with crude oil in an amount such that the final blend will be homogeneous and contain not more than about 0.4 wt % of the aqueous emulsion.

Figure 3:
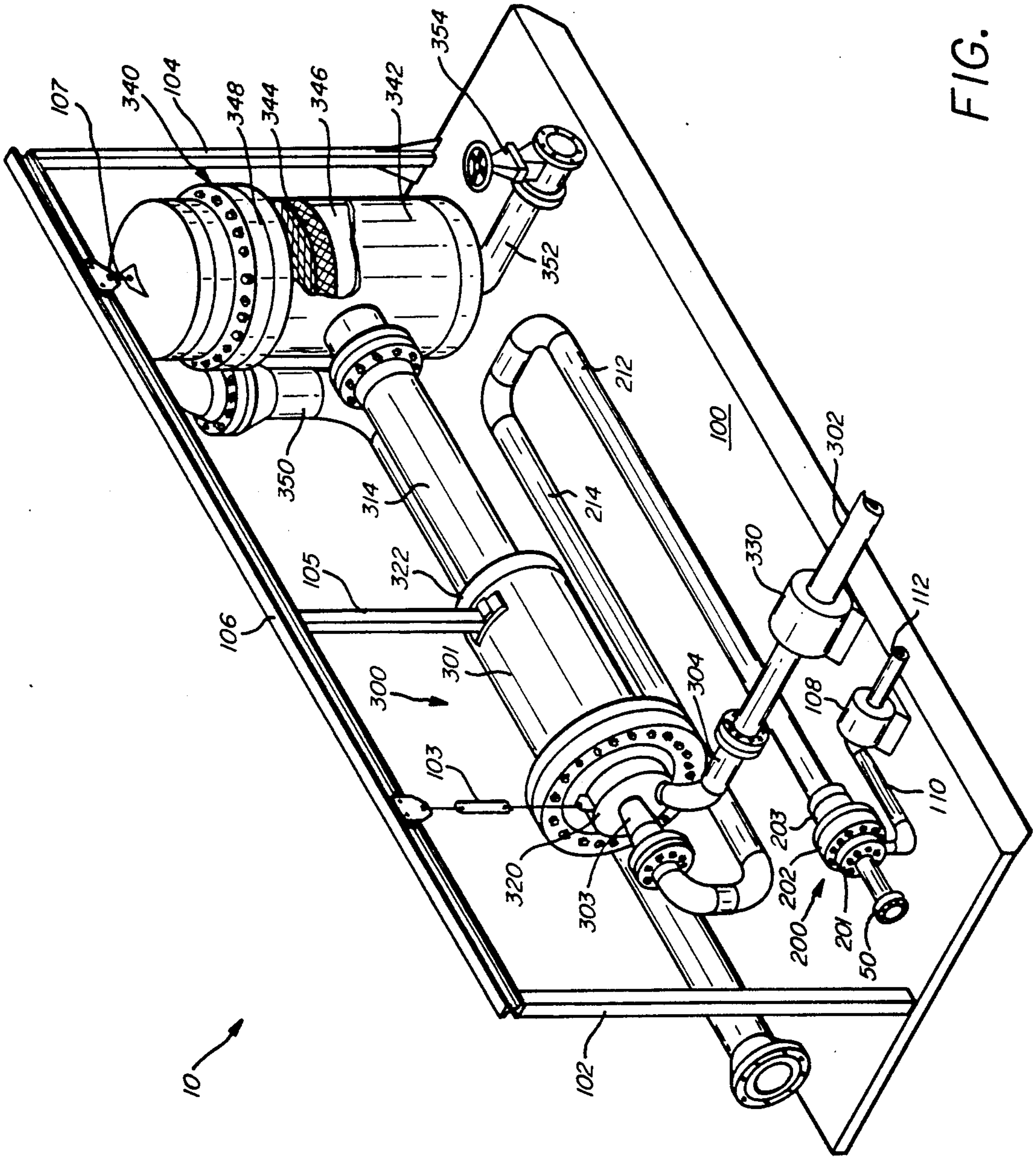
FIG. 3 is a perspective view, with parts broken away, showing a preferred embodiment of the dynamic in-line blender of the present invention.
Figure 5:
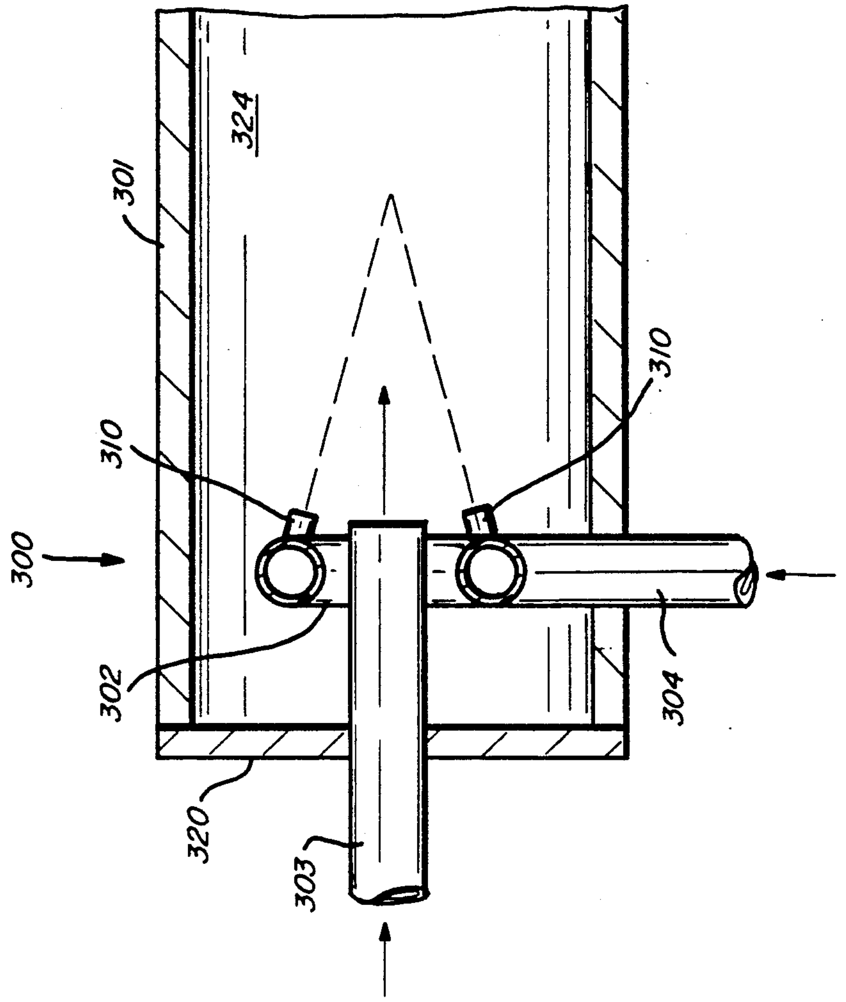
FIG. 5 is a fragmentary longitudinal sectional view to an enlarged scale of the blending apparatus positioned inside the secondary dynamic blender of the present invention.

In accordance with the present invention, and as shown in FIG. 3, an in-line blender 10 is provided which is preferably mounted on a movable base, such as a skid base 100. The skid base 100 may be provided with suitable support means such as support beams 102 and 104 for a cross-beam 106 on which the in-line blender 10 may be suspended by any suitable means such as a cable 103, a beam 105, a bracket 107, etc.

The in-line blender 10 of the present invention comprises a primary dynamic blender 200 comprising a tubular housing, 202 (FIG. 2) coaxially aligned with surface line 50 at inlet end 201 and a connecting line 212 at inlet end 203 of chamber 205.

Figure 4:
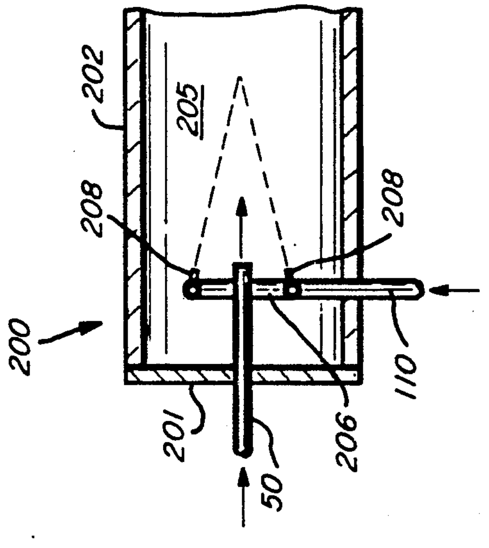
FIG. 4 is a fragmentary longitudinal sectional view to an enlarged scale of the blending apparatus positioned inside the primary dynamic blender of the present invention.

Located within the chamber 205 of the primary dynamic blender housing 202 is a circular header 206 (FIG. 4) which surrounds the primary surface inlet line 50 and is provided with a plurality of ejection nozzles 208 that are circumferentially spaced about the header 206, each of the nozzles 208 being angled so as to be focused on a focal point coaxially aligned with the connecting line 212 about 2 to about 4 circular header diameters downstream of the header 206.

As is shown more clearly in FIG. 3, the aqueous crude oil emulsion is fed to the dynamic in-line blender 10 of the present invention by way of an aqueous emulsion surface line 50 fluidly interconnected with the outlet line 30 and crude oil is fed to the primary dynamic blender through line 112 and pump 108 to a primary blender oil charge line 110.

Crude oil is fed to the primary dynamic in-line blender 200 through the primary charge line 110 leading to primary header 206 and is then forced through the ejection nozzles 208 at a suitable rate and pressure so as to form a flowing conical crude oil shear curtain. The aqueous crude oil emulsion is fed to the primary dynamic blender 200 through surface line 50 and enters the primary dynamic in-line blender 200 inside of the flowing conical crude oil shear curtain and then flows through the apex of the flowing conical crude oil shear curtain where it is impacted upon and fragmented by the crude oil of the flowing conical crude oil shear curtain into finely divided aqueous crude oil emulsion particles that are suspended in the crude oil to thereby form an initial blend of aqueous crude oil emulsion particles with crude oil that flows from the primary dynamic in-line blender 200 into the connecting line 212.

The initial blend then flows through the connecting line 212 to a secondary dynamic in-line blender 300. The secondary dynamic in-line blender 300 comprises a secondary tubular casing 301 coaxially aligned with a secondary blender outlet line 314. The secondary blender 300 is provided with a secondary blender crude oil inlet line 304 and a secondary blender inlet line 303 fluidly connected with the connecting line 212 which terminates through inlet end 320 inside secondary blender chamber 324 ofthe tubular casing 301 of the secondary blender 300.

A circular secondary header 302 is provided through which crude oil is charged by a secondary crude oil inlet line 304. Crude oil is discharged from the header 302 through a plurality of secondary blender ejection nozzles 310 circumferentially spaced about the circular header 302 and angled on the downstream side thereof in chamber 324 to a focal point coaxial with the outlet line 314 about 2 to about 4 secondary circular header diameters from the ejection nozzles 310. The initial blend of crude oil aqueous emulsion formed in the primary header 200 is charged through the secondary blender inlet line 303 and further blended with additional crude oil in the secondary blender 300 and flows therefrom through the outlet end 322 through secondary blender outlet line 314. In accordance with the preferred embodiment of the present invention, the secondary blender outline 314 leads to a filter 340 comprising, for example, an upstanding drum 342 provided with a secondary mixing zone screen pack 344 containing screens having a mesh size of not more than about ¾-inch (e.g., 3/16-inch to ¾-inch). As a consequence, the filter drum 342 will be divided into a lower inlet zone 346 and an upper outlet zone 348 by the screen pack 344. The finally blended mixture of particles of aqueous crude oil emulsion and crude oil is charged to the lower inlet zone 346 for upward flow through the screen pack 344 and outwardly therefrom into upper outlet zone 348 and thence from the unit by way of a discharge line 350.

From time to time, as foreign solids accumulate on the bottom of the filter drum 342, the valve 354 in the sump line 352 may be opened in order to flush the foreign solids from the drum 342.

OPERATION

By way of example, if the aqueous crude oil emulsion 24 withdrawn from the salt dome cavern 18 in the salt dome 12 contains about 40 wt. % of water and, correspondingly, about 60 wt. % of "entrapped" crude oil and if it is to be blended with a crude oil having a BS&W content of about 0.2 wt. %, the final blend of finely divided particles of the aqueous crude oil emulsion suspended in the crude oil should comprise a mixture of about 50 barrels of the crude oil per barrel of aqueous crude oil emulsion. However, the aqueous emulsion must be fragmented so that it will remain disbursed in and not settled from the crude oil as it passes through the discharge line 350 to a suitable transportation means such as a pipeline (not shown).

In accordance with the present invention, this is accomplished by feeding a first stream of crude oil to a primary dynamic mixer 200 through charge line 110 and discharging the first stream of crude oil through the nozzles 208 at a flow rate of about 200 to about 500 ft./sec. and a pressure of about 2,000 to about 4,000 psi to establish a primary flowing crude oil conical shear curtain.

a stream of the aqueous crude oil emulsion is fed to the primary blender 200 and the interior of the primary flowing crude oil conical shear curtain through the surface line 50 at a flow rate of about 0.1 to about 0.3 times the rate of flow of the first stream of crude oil from whence the stream of the aqueous crude oil emulsion flows through the apex of the primary flowing crude oil conical shear curtain whereby the aqueous crude oil emulsion is impacted upon and fragmented by the primary flowing crude oil conical shear curtain to form aqueous emulsion particles having diameters in the range of about 0.1 to about 10 microns and whereby the fragments are mixed with the first stream of crude oil to thereby form an initial blend of the fragments of the aqueous emulsion in the first stream of said crude oil for flow from the primary dynamic mixer 200 by the connecting line 212.

The initial blend is then charged by the connecting line 212 to a secondary dynamic blender 300. A second stream of crude oil is charged to the secondary dynamic blender 300 through a secondary crude oil inlet line 304 and from the secondary ejection nozzles 310 at a flow rate of about 20 to about 100 ft./sec. and a pressure of about 50 to about 500 psi to establish a secondary flowing crude oil conical shear curtain.

The initial crude oil blend is charged to the interior of the secondary flowing crude oil conical shear curtain through the inlet line 303 at a flow rate of about 0.1 to about 0.3 times the rate of flow of the second stream of crude oil where it flows into contact with the secondary flowing orude oil conical shear curtain whereby the initial crude oil blend is impacted upon by the secondary flowing crude oil conical shear curtain and mixed with the second stream of crude oil to thereby form a final homogenous blend of the fragments of the aqueous crude oil emulsion in the first and second streams of crude oil.

In accordance with this embodiment, for example, about 100 gallons per minute of the aqueous crude oil emulsion are charged to the primary dynamic in-line blender 200 through surface line 50 and about 450 gallons per minute of crude oil are charged to the initial primary dynamic in-line blender 200 by way of the charge line 110 at a pressure of about 3,500 psi. As a consequence, the crude oil will be ejected through the nozzles 208 of the circular header 204 at a rate of about 350 feet per second and a pressure of about 3,500 psi to form a flowing conically shaped shear stream of crude oil.

The 100 gallons per minute of aqueous crude oil emulsion, fed by way of the surface line 50, will be impacted upon, fragmented and mixed with the crude oil as it flows through the shear curtain to form an initial blend which is discharged from the primary dynamic blender by way of connecting line 212.

The initial blend is delivered by the secondary dynamic blender by the line 212 at the rate of about 550 gallons per minute.

An additional 3,650 gallons per minute of crude oil will be fed to the secondary dynamic blender 300 through the inlet line 304 at a pressure of about 125 psi to form a secondary shearing curtain as the crude oil flows through secondary blending nozzles 310.

As a consequence, the particles of the aqueous emulsion of crude oil will be further disbursed and blended with the additional crude oil charged by line 304. The final blend will be discharged by a secondary dynamic blender outlet line 314. The final blend of crude oil with the aqueous emulsion will be in the ratio of about 40 barrels of crude oil to about 1 barrel of aqueous crude oil emulsion, the blend being discharged at the rate of about 4,200 gallons per minute and having a maximum BS&W content of about 0.6 wt. %

It will be understood that the foregoing description is by way of example only, and that other embodiments of the apparatus of the present invention may be used to practice other embodiments of the process of the present invention; the scope of the present invention being defined by the appended claims.

What is claimed is:

1. A dynamic tubular in-line blender for homogeneously mixing an aqueous hydrocarbon emulsion with a crude oil which comprises a tubular housing, a circular crude oil header circumferentially coaxially mounted in said tubular housing, an emulsion inlet line coaxially mounted in said tubular housing inside of and in coaxial alignment with said circular header and said tubular housing, a crude oil charge line fluidly connected with said circular header and a plurality of crude oil ejection nozzles peripherally mounted about said circular header and angled toward a coaxial focal point to about 2 to 4 circular header diameters downstream from said circular header, whereby crude oil charged to said circular header will be discharged therefrom through said ejection nozzles into the interior of said dynamic blender in the form of a flowing crude oil shear curtain defining a zone of flow conjunction and whereby an aqueous hydrocarbon emulsion charged to said dynamic blender through said emulsion inlet line will flow into and be impacted upon and fragmented by the flowing crude oil shear curtain in said zone of flow conjunction to form a flowing suspension of finely divided aqueous emulsion particles in the said oil.

2. An in-line crude oil blending device for homogeneously mixing an aqueous crude oil emulsion with crude oil which comprises:

a base, a primary dynamic in-line blender comprising a tubular primary blender housing and a primary blender outlet line coaxially mounted on said base, said primary blender housing having mounted therein:

an aqueous crude oil emulsion inlet line coaxially aligned with said primary blender housing, a circular primary crude oil header circumferentially positioned about said emulsion inlet line, a primary crude oil inlet line fluidly connected with said primary header and a plurality of primary header crude oil ejection nozzles peripherally mounted on said primary header and angled to a cbaxial focal point about 2 to 4 primary header diameters downstream of said primary header whereby crude oil ejected from said primary header nozzles will form a primary flowing conical shear curtain defining a zone of flow conjunction and whereby aqueous emulsion charged to said dynamic blender through said emulsion inlet line will flow into and be impacted upon and fragmented by the flowing crude oil shear curtain in said zone of flow conjunction to form an initial crude oil blend;

a secondary dynamic blender mounted on said base comprising a tubular secondary blender housing, a coaxial secondary blender inlet line extending into said tubular secondary blender housing, a connecting line interconnecting the discharge end of said primary blender housing with said secondary blender inlet line;

said secondary blender housing having a secondary blender outlet line mounted therein and also having a circular secondary crude oil header mounted therein and circumferentially positioned about said secondary blende inlet line;

a secondary crude oil inlet line fluidly connected with said secondary header and a plurality of secondary crude oil ejection nozzles peripherally mounted on said secondary header and angled to a coaxial focal point about 2 to 4 secondary header diameters downstream of said secondary header whereby crude oil ejected from said secondary header ejection nozzles will form a secondary flowing conical shear curtain defining a secondary zone of flow conjunction and whereby initial crude oil blend charged to said secondary dynamic blender through said connecting line will flow into and be impacted upon and fragmented by the flowing secondary crude oil shear curtain in said secondary zone of flow conjunction to form a final crude oil blend for discharge through said secondary blender outlet line.

3. A dynamic in-line blender as in claim 2 wherein a filter is mounted downstream of said secondary blender and fluidly interconnected with said secondary blender outlet line, and filter comprising a static mixing screen pack containing openings not larger than about ¾-inch.

4. An in-line crude oil blending device for homogeneously mixing an aqueous crude oil emulsion with crude oil which comprises:

a portable base;

primary dynamic in-line blender comprising a tubular primary blender housing and a smaller primary blender outlet line coaxially mounted on said base, said primary blender housing having mounted therein:

an aqueous crude oil emulsion inlet line coaxially aligned with said primary blender housing, a circular primary crude oil header circumferentially positioned about said emulsion inlet line, a primary crude oil inlet line fluidly connected with said primary header and a plurality of primer header crude oil ejection nozzles peripherally mounted on said primary header and angled to a coaxial focal point about 2 to 4 primary header diameters downstream of said primary header whereby crude oil ejected from said primary header nozzles will form a primary flowing conical shear curtain defining a zone of flow conjunction and whereby aqueous emulsion charged to said dynamic blender through said emulsion inlet line will flow into and be impacted upon and fragmented by the flowing crude oil shear curtain in said zone of flow conjunction to form an initial crude oil blend;

secondary dynamic mixing means having an inlet line fluidly interconnected with said primary dynamic mixing means, said secondary dynamic mixing means also comprising a tubular secondary blender housing, a secondary mixing means out let line and extending into said tubular secondary blender housing, said secondary blender housing having a circular secondary crude oil header mounted therein and circumferentially positioned about said secondary blender inlet line, a secondary crude oil inlet line fluidly connected with said secondary header and a plurality of secondary crude oil ejection nozzles peripherally mounted on said secondary header and angled to a coaxial focal point about 2 to 4 secondary header diameters downstream of said secondary header whereby crude oil ejected from said secondary header ejection nozzles will form a seoondary flowinq oonioal shear ourtain defininq a seoondary zone of flow conjunction and whereby initial crude oil blend charged to said secondary dynamic blender through said connecting line will flow into and be impacted upon and fragmented by the flowing secondary crude oil shear curtain in said secondary zone of flow conjunction to form a final crude oil blend for discharge through said secondary blender outlet line;

a filter drum mounted on said base and fluidly interconnected adjacent the bottom side thereof with said secondary blender outlet line, said filter drum having filter screen means mounted in and extending laterally across said filter drum above said secondary outlet line and dividing the interior of said filter drum into a lower inlet chamber and an upper outlet chamber, said filter screen means comprising screens having a mesh not larger than about ¾-inch; and a discharge line fluidly interconnected with said upper outlet chamber.

5. A method for blending an aqueous crude oil emulsion withdrawn from a salt dome storage cavern in a salt dome with a crude oil which comprises the steps of forming said crude oil into a flowing conical crude oil shear curtain angled toward an apex coaxially aligned with the inlet and the outlet to the mixing chamber and forcing a stream of said aqueous crude oil emulsion from the interior of the said flowing conical crude oil shear curtain through the apex thereof, whereby the said aqueous emulsion stream will be impacted upon at said apex and fragmented by the said crude oil of the flowing conical crude oil shear curtain to form a flowing suspension of finely divided particles of said aqueous emulsion in the said crude oil.

6. A method as in claim 5 wherein an additional stream of crude oil is formed into a second flowing conical crude oil shear curtain and wherein said initially formed flowing suspension of finely divided particles of said aqueous emulsion in the said crude oil is charged to the said second flowing conical crude oil shear curtain thereby further impacting upon and blending said particles of said aqueous emulsion with said additional stream of said crude oil.

7. A method as in claim 6 wherein the crude oil is initially formed into a flowing crude oil shear curtain having a flow rate of about 200 to about 500 ft./sec. and a pressure of about 2,000 to about 4,000 psi and wherein the additional crude oil is formed into a second flowing crude oil shear curtain having a flow rate of about 20 to about 100 ft./sec. and a pressure of about 50 to about 500 psi.

8. A method for in-line blending and homogeneously mixing an aqueous crude oil emulsion withdrawn from a salt dome storage cavern with crude oil which comprises:

feeding a first stream of crude oil to a chambered primary dynamic in-line blender and to a nozzled crude oil header into said chamber at a flow rate of about 200 to about 500 ft./sec. and a pressure of about 2,000 to about 4,000 psi to form said first stream of crude oil into a primary flowing crude oil shear curtain defining a primary zone of flow conjunction and feeding said aqueous crude oil emulsion to said chamber for flow into said primary flowing crude oil shear curtain in said zone of flow conjunction for fragmentation and mixing therein with said first stream of crude oil to form an initial flowing suspension of finely divided aqueous emulsion particles in the said first stream of crude oil;

feeding a second stream of crude oil to the chamber of a chambered secondary dynamic in-line blender and to a header mounted in said secondary chamber and discharging said second stream of crude oil from said header at a flow rate of about 20 to about 100 ft./sec. and a pressure of about 50 to about 500 psi to form a said second stream of crude oil into a secondary flowing crude oil shear curtain defining a secondary zone of flow conjunction and feeding said initial suspension to said secondary chamber at a flow rate of about 0.1 to about 0.3 times the flow rate of said second stream of crude oil for flow into said secondary flowing crude oil shear curtain in said secondary zone of flow conjunction for fragmentation and mixing therein with said second stream of crude oil to form a final flowing suspension of finely divided aqueous emulsion particles in the said first and second streams of crude oil, times the rate of flow of said second stream of crude oil and forcing said stream of said initial crude oil blend through the apex of said secondary flowing crude oil conical shear curtain whereby said initial crude oil blend will be impacted upon by said secondary flowing crude oil conical shear curtain and mixed with said second stream of crude oil to thereby form a final blend of said fragments of said aqueous emulsion in said second stream of crude oil.

9. A method for removing and transporting an aqueous crude oil emulsion from a subterraneous storage cavern in a subterraneous salt dome wherein said aqueous emulsion layer is positione din said cavern intermediate a lower water layer and an upper crude oil layer, wherein a casing extends from a discharge line at surface to said emulsion layer in said cavern, wherein a tubing extends from a surface water line through said casing into said cavern and into said water layer, said method comprising the steps of:

injecting water through said tubing into said water layer in said storage cavern to thereby force a portion of said aqueous emulsion through the hanging casing-tubing annulus to and throughs aid surface line, interconnecting said surface line with the chamber of a dynamic in-line blender comprising a chambered housing having a crude oil header mounted therein crosswise of the direction of flow of said aqueous emulsion through said chamber, charging crude oil to said header and discharging said crude oil from said header into said chamber in the form of a flowing crude oil shear curtain, at a flow rate of about 200 to about 500 feet/second and a pressure of about 2,000 to about 4,000 psi, defining a zone of flow conjunction, and charging said aqueous emulsion from said surface line into the chamber of said dynamic blender at a flow rate of about 0.1 to about 0.3 times the rate of flow of each stream of crude oil and flowing said aqueous emulsion into said zone of flow conjunction, whereby said aqueous emulsion will be impacted upon in said zone of flow conjunction by said flowing crude oil shear curtain and fragmented to thereby form a flowing suspension in said conjunction zone of finely divided aqueous emulsion particle shaving diameters of from about 0.1 to about 10 microns in the said crude oil.

* * * * *